M. LANSBURGH.
LIQUID-FILTER.
No. 189,364. Patented April 10, 1877.
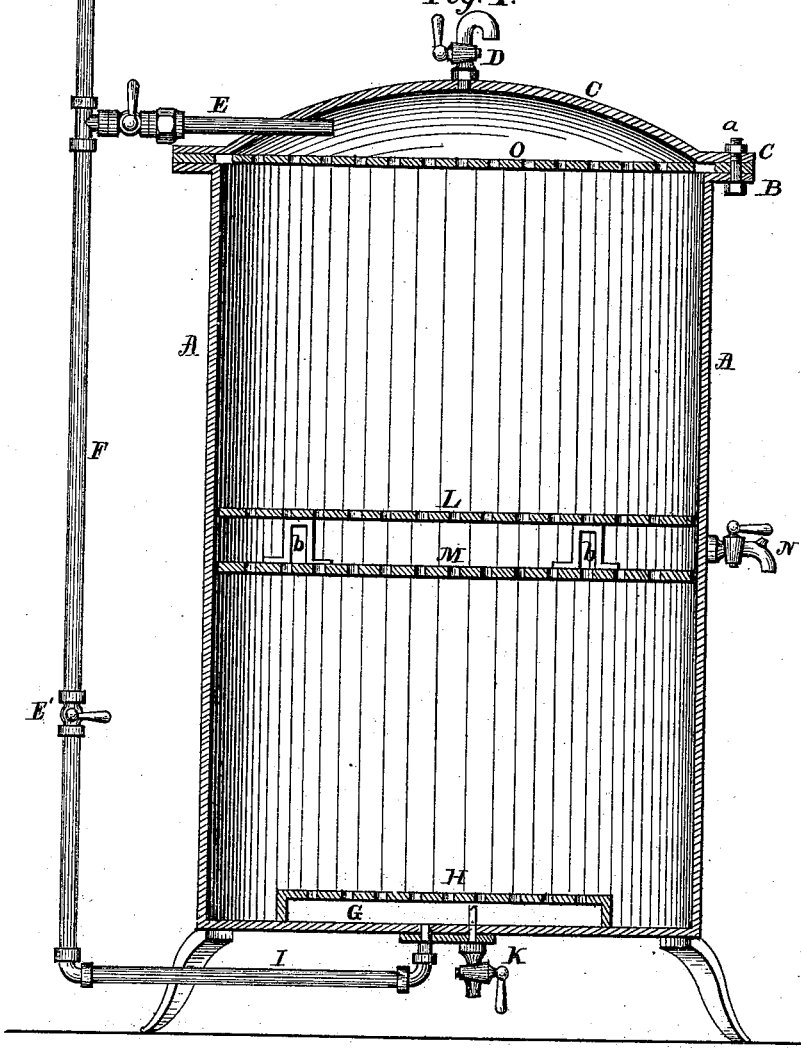

UNITED STATES PATENT OFFICE.

MAX LANSBURGH, OF BALTIMORE, MARYLAND.

IMPROVEMENT IN LIQUID-FILTERS.

Specification forming part of Letters Patent No. 189,364, dated April 10, 1877; application filed February 20, 1877.

*To all whom it may concern:*

Be it known that I, MAX LANSBURGH, of the city of Baltimore, county of Baltimore, and State of Maryland, have invented certain new and useful Improvements in Apparatus for Filtering Liquids; and I do hereby declare that the following is a full, clear, and exact description of the same, reference being had to the accompanying drawing, making part of this specification.

The object of my invention is to equalize the pressure of the liquid upon the filtering material by introducing the liquid on the top and bottom of the vessel A, and to draw it off through the stop-cock N, having first passed through the movable diaphragms L and M, thereby avoiding channels or rents in the coal or other material.

The apparatus is illustrated—in Figure 1, a vertical section, and in Fig. 2, a perspective view of the movable diaphragms.

A designates a vessel, of any suitable size, form, and material. It has a large rim, B, to which is hermetically secured the cover C, by means of screw-bolts $a$ or otherwise. The cover has on the top a short pipe with a stop-cock, D, and near the cover-flange a pipe, E, with a stop-cock connecting with the main pipe F. At the bottom, in the interior of vessel A, is the supply-chamber G, formed by the perforated cap H. The liquid is introduced in said chamber by the pipe I and stop-cock E'. In the center of the bottom of vessel A is a short pipe and stop-cock, K. About equal distance from top and bottom of vessel A is a large stop-cock, N, inserted into the side of the vessel. In a line with said stop-cock N are placed the movable diaphragms L and M, consisting of metal plates, exactly fitting the inside of the vessel. These plates are perforated, and kept apart by saddles $b\ b\ b$, (see Fig. 2,) forming a chamber, where the liquid from above and below is collected and drawn off at stop-cock N. O and H are the distributing-diaphragms.

Operation: The apparatus is partly filled with charcoal or other material suitable for filtering or rectifying liquids. When the coal reaches the stop-cock N the diaphragms L and M are inserted and placed just opposite the stop-cock N. The space above the diaphragm is also filled with coal, and upon the top of it is placed the perforated plate O, and the cover C fitted to the rim B. The stop-cocks D and K are now opened, and the liquid, through the main pipe F, let in from above and below. When the air has escaped through stop-cocks D and K these orifices are closed and the stop-cock N opened, to allow the filtered liquid to escape.

By this arrangement I avoid channels or rents in the filtering material, and accelerate the operation of filtering.

What I claim, and desire to secure by Letters Patent, is—

1. The combination of the movable diaphragms L and M with the stop-cock N.

2. The combination of the stop-cocks D and K with the cover and air-chamber G near the bottom.

3. The combination of the diaphragms L and M, having between them stop-cock N, with the vessel A, having inlets E and I at its top and bottom, respectively, whereby the liquid is passed through the two bodies of filtering material in opposite directions, and is drawn off at the middle of the vessel, or thereabout, substantially as and for the purpose described.

MAX LANSBURGH.

Witnesses:
W. T. JOHNSON,
GEO. R. COPELAND.